A. A. BOWSER.
SEPARATOR TANK.
APPLICATION FILED APR. 29, 1907.

932,532.

Patented Aug. 31, 1909.

Witnesses:

Inventor:
A. A. Bowser
by Brown & Hopkins
Attys

UNITED STATES PATENT OFFICE.

ALLEN A. BOWSER, OF FORT WAYNE, INDIANA, ASSIGNOR TO S. F. BOWSER & CO., INC., OF FORT WAYNE, INDIANA, A CORPORATION OF INDIANA.

SEPARATOR-TANK.

932,532.

Specification of Letters Patent. Patented Aug. 31, 1909.

Application filed April 29, 1907. Serial No. 370,995.

*To all whom it may concern:*

Be it known that I, ALLEN A. BOWSER, a citizen of the United States, residing at Fort Wayne, in the county of Allen and State of Indiana, have invented certain new and useful Improvements in Separator-Tanks, of which the following is a specification.

This invention relates to improvements in separator tanks particularly adapted for use in garages or similar places and the primary object of the invention is to provide an improved tank of this character adapted to receive the wash water from the catch basin for the purpose of separating the oils and grease from the water which has been taken up by the latter to prevent the oils and grease from being discharged into the sewer pipe or trap.

A further object is to provide improved means for causing the water to accumulate in the tank to permit the oil and grease to separate therefrom, and improved means for preventing the discharge of the water when a predetermined amount of oil and grease has accumulated in the tank.

A further object is to provide improved means for preventing the incoming water from passing directly out of the discharge pipe before the oil and grease is separated therefrom, and improved means for withdrawing the oil and grease from the tank.

A further object is to provide an improved device of this character which will be simple, cheap and durable in construction and efficient and effective in operation.

To the attainment of these ends and the accomplishment of other new and useful objects, as will appear, the invention consists in the features of novelty in the construction, combination and arrangement of the several parts hereinafter more fully described and claimed and shown in the accompanying drawing, illustrating an exemplification of the invention and in which—

Figure 1:
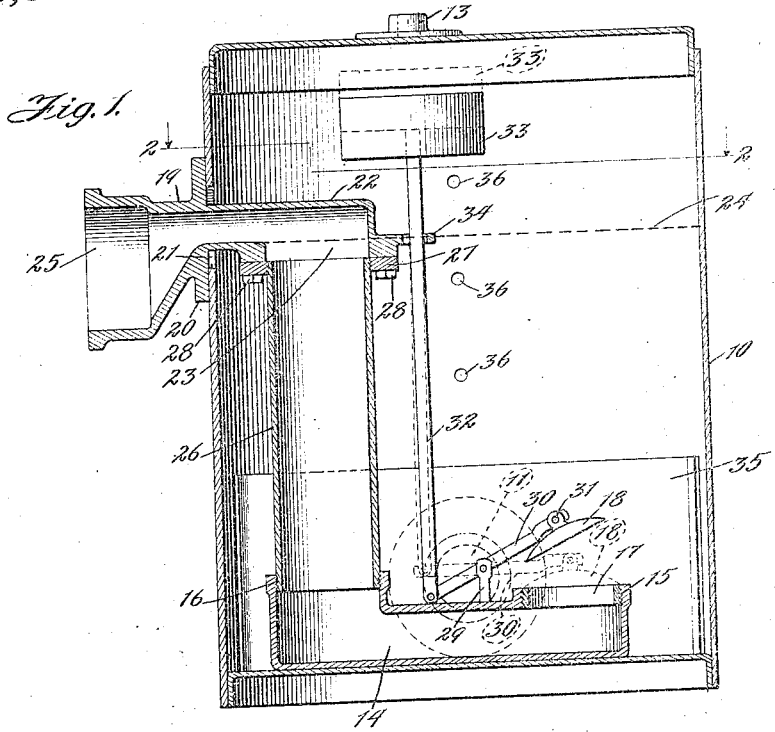
Figure 2:
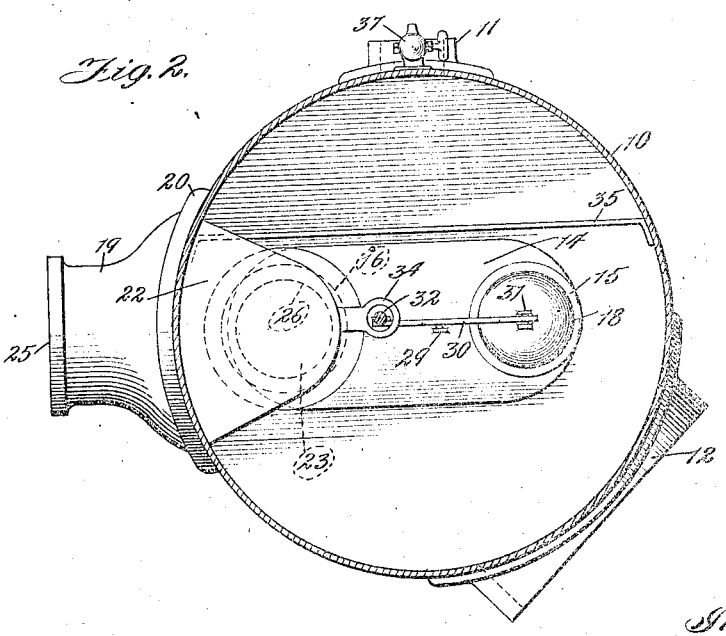

Figure 1 is a longitudinal sectional view of an improved tank of this character constructed in accordance with the principles of this invention. Fig. 2 is a sectional view on line 2—2 of Fig. 1.

Referring more particularly to the drawing and in this exemplification of the invention, the numeral 10 designates a closed tank of any desired size and configuration and constructed of any material suitable for the purpose. This tank is provided with an inlet opening 11, located in the side preferably adjacent the bottom thereof, a manhole 12 and a suitable vent opening 13, which latter is preferably located in the top of the tank.

Within the tank is a suitable housing or tubular member 14, which is provided with a flat bottom adapted to rest upon the bottom of the tank. This housing or member 14 is also provided with an inlet opening 15 and an outlet 16 located in the upper face or wall thereof and both of said openings 15 and 16 are preferably provided with interior screw threads. A suitable bushing 17 provided with exterior screw threads is seated within the opening 15 so that the threads thereon will engage the threads in the opening to prevent displacement of the bushing and said bushing forms a seat for a suitable valve 18, which latter is adapted to close the inlet opening 15 of the housing or tubular member 14 when the valve is seated upon the bushing 17, as shown in dotted lines in Fig. 1.

Extending through the side of the tank is a discharge pipe or nozzle 19, which is preferably provided with a projecting flange 20, adapted to cover the opening 21 in the side of the tank through which the pipe or nozzle 19 projects and said pipe or nozzle is securely held in position in any desired or suitable manner. The portion of the pipe or nozzle 19 which projects inside of the tank, preferably tapers toward the extremity thereof, as shown more clearly at 22 in Fig. 2 of the drawing, and said tapering extremity is provided with an opening 23 in the lower face thereof. This opening is preferably of a diameter equal to the diameter of the outlet opening 16 of the tubular member or housing 14, and said openings 23 and 16 are spaced from each other and arranged in registering position with relation to each other. The pipe or nozzle 19 may be arranged at any desired point in the height of the tank according to the height that it is desired to maintain the water level as indicated at 24. The outlet opening 25 of the pipe or nozzle may be of any desired configuration and to said nozzle is adapted to be coupled or secured any suitable discharge pipe (not shown) for conveying the water as it passes from the tank to the sewer trap or pipe. A suitable tubular member 26 is preferably provided with peripheral screw threads adjacent the extremities thereof and said tubular member is preferably of an exterior diameter slightly smaller than the interior diameter of the openings 16 and 23 respectively of the tubular member or housing 14 and the discharge pipe or nozzle 19. One extremity of the tubular member 26 is adapted to be seated within the outlet opening of the housing or member 14 in such a manner that the screw threads on said extremity will engage the threads in the opening 16 and said tubular member is of such a length that the other extremity thereof will stand adjacent to the opening 23 in the pipe or nozzle 19. A suitable collar or sleeve 27 is provided with interior threads adapted to engage the exterior threads on the free extremity of the tubular member 26 and said sleeve or collar 27 is adapted to be secured to the pipe or nozzle 19 for holding the extremity of the tubular member 26 in registration with the opening 23 in any desired or suitable manner, such as by means of screws or bolts 28 passing through the sleeve or collar 27 and into the adjacent portion of the pipe or nozzle 19.

In constructing this tank, one end of the tubular member 26 is secured to the housing or member 14 and the free extremity thereof is placed adjacent the opening 23 in the pipe or nozzle 19 after the sleeve or collar 27 has been placed upon said extremity. When in this position, the sleeve or collar 27 may be screwed or adjusted upon the extremity of the tubular member 26 until it engages the face of the pipe or nozzle 19, and a further adjustment of the sleeve or collar 27 against the face of the pipe or nozzle 19 will exert an endwise pressure upon the tubular member 26 to force the housing or member 14 against the bottom of the tank to hold the housing or member 14 against displacement. After the desired pressure has been obtained, the sleeve or collar may be secured against further movement by means of the screws or bolts 28. A suitable support or fulcrum 29 is arranged upon the housing or member 14 adjacent the inlet opening 15 and a lever 30 is pivotally supported intermediate its ends by the fulcrum 29. One end of this lever is connected as at 31 to the valve 18 and pivotally connected to the free end of the lever is a bar or member 32, which extends upwardly toward and terminates short of the top of the tank, and supported by the free end thereof is a suitable float 33. A suitable guide 34 is provided for the bar or member 32 and said guide is preferably supported by the pipe or nozzle 19.

Arranged within the tank 10 and extending transversely of the tank is a partition 35, which is of any desired height to extend above the tubular member or housing 14 and is disposed between the housing or member 14 and the inlet opening 11 of the tank. This partition 35 is preferably spaced from the inlet opening 11 and serves as a means for preventing the formation of an eddy as the water enters the pipe and prevents the water from passing directly into the inlet opening 15 of the tubular member or housing 14 and causes the water to accumulate in the tank.

A plurality of apertures or openings 36 are arranged in the side of the tank and secured to the tank adjacent each of the apertures 36 is a stop cock 37, and said stop cocks are for the purpose of withdrawing the oil and grease from the tank which has accumulated on the top of the water.

In use, the water passing from the catch basin enters the tank through the inlet opening 11 and as the discharge inlet of the pipe or nozzle 19 is located at some distance above the bottom of the tank, the incoming water will strike the partition 35 and will accumulate in the tank until the water level 24 is reached. The weight of the float 33, together with that of the bar or member 32, will cause the valve 18 to remain unseated. As the water, together with the oil and grease, accumulates in the tank, the oil and grease will separate itself from the water by passing to the top thereof and will accumulate upon the top of the water, after which it may be drawn from the tank by the stop cocks 37.

If it should so happen that the tank is neglected and the oil and grease is not drawn from the top of the water but allowed to accumulate in the tank, the float 33 will be raised by the accumulation of the oil and grease above the water level and by raising the float the valve 18 will be closed, which will cause the incoming water to accumulate in the feed pipe and also in the catch basin, from which the operator will know that the oil and grease must be drawn from the tank, otherwise it will be forced into the sewer pipe or trap. After the oil and grease has been withdrawn by means of the cocks 37, the float 33 will descend and open the valve 18 to permit the water to pass through the tubular member or housing 14 and out through the discharge pipe or nozzle 19.

What is claimed as new is:—

1. The combination of a tank provided with an inlet opening adjacent the bottom thereof, a tubular discharge member extending into the tank, the inlet end of which is located adjacent the bottom and within the tank, the outlet end being located adjacent the top and on the outside of the tank, a baffle plate within the tank disposed between the said inlet openings, a closure for the inlet end of the discharge member and means for normally holding the said inlet end of the discharge member open.

2. The combination of a tank provided with an inlet opening adjacent the bottom thereof, a tubular discharge member extending into the tank, the inlet end of which is located within and adjacent the bottom of the tank, the outlet end being located adjacent the top of the member, said closure being inlet end of the member, said closure being normally unseated, and means influenced by the height of the liquid in the tank for controlling the closure.

3. The combination of a tank provided with an inlet opening adjacent the bottom thereof, a tubular discharge member extending into the tank, the inlet end of which is located within and adjacent the bottom of the tank, the outlet end being located adjacent the top of the tank, a closure for the inlet end of the member, and means influenced by the height of the liquid in the tank for controlling the closure, said means being adapted to normally unseat the closure.

4. The combination of a tank provided with an inlet opening adjacent the bottom thereof, a tubular discharge member extending into the tank, the inlet end of which is located within and adjacent the bottom of the tank, the outlet end being located adjacent the top of the tank, a closure for the inlet end of the member, a baffle plate disposed between the inlet openings, and means influenced by the height of the liquid in the tank for controlling the closure, said means being adapted to normally unseat the closure.

5. The combination of a tank provided with an inlet opening, a tubular discharge member extending into the tank with the inlet opening therein adjacent the bottom of the tank, said member being provided with an adjustable section for securing the member against displacement, a normally open closure for the inlet end of the discharge member and means for controlling said closure.

6. The combination of a tank provided with an inlet opening, a tubular discharge member comprising spaced sections, one of said sections being located within and resting upon the bottom of the tank and provided with an inlet opening, another section passing through the wall of the tank and located above the first said section, an additional section disposed between and communicating with the first two said sections, means operatively related to the last said section for adjusting one of the sections with relation to the other to force the first said section against the bottom of the tank to prevent displacement of the section, and means for controlling the inlet of the first section.

7. The combination of a tank provided with an inlet opening, a tubular discharge member comprising spaced sections, one of said sections being located within and resting upon the bottom of the tank and provided with an inlet opening, another section passing through the wall of the tank and located above the first said section, an additional section disposed between and communicating with the first two said sections, means operatively related to the last said section for adjusting one of the sections with relation to the other to force the first said section against the bottom of the tank to prevent displacement of the section, a baffle plate disposed between the said inlet openings, and means for controlling the inlet of the first section.

8. The combination of a tank provided with an inlet opening, a tubular discharge member comprising a plurality of sections, one of said sections being located within and resting upon the bottom of the tank and provided with an inlet opening, another section being rigidly supported by and passing through the wall of the tank, an adjustable connection between the sections whereby the first section may be moved with relation to the second section to force the first section against the bottom of the tank to prevent displacement of said section and means influenced by the height of the liquid for controlling the inlet opening of the discharge member.

9. The combination of a tank provided with an inlet opening, a tubular section located within and resting upon the bottom of the tank and being provided with an inlet opening, a discharge section supported by and passing through the wall of the tank, a tubular connection between the sections, an adjustable collar supported by the connection and adapted to engage one of the sections to separate the sections for forcing one of the sections against its support to prevent displacement thereof, and means for controlling the inlet opening of the first section.

10. The combination of a tank provided with an inlet opening, a tubular section located within and resting upon the bottom of the tank and being provided with an inlet opening, a discharge section supported by and passing through the wall of the tank, a tubular connection between the sections, an adjustable collar supported by the connection and adapted to engage one of the sections to separate the sections for forcing one of the sections against its support to prevent displacement thereof, means for securing the collar in its adjusted position to the adjacent section, and means for controlling the inlet opening of the first section.

11. The combination of a tank provided with an inlet opening, a discharge member extending into the tank and provided with an inlet opening adjacent the bottom of the tank, means for causing the oil and water to accumulate in the tank whereby the oil will separate from and accumulate upon the surface of the water, means for drawing off the separated oil at intervals throughout the height of the tank, and means for controlling the inlet opening of the discharge member.

12. The combination of a tank provided with an inlet opening, a discharge member separate from and extending into the tank and provided with an inlet opening adjacent the bottom and an outlet located above the inlet opening, means for securing the discharge member against displacement, means for causing the water and oil to accumulate in the tank whereby the oil will separate from the water and accumulate in the tank above the water level, means for drawing off the separated oil, a normally opened closure for the inlet of the discharge member and means influenced by the accumulation of the oil for controlling said closure.

13. The combination of a tank provided with an inlet opening, a tubular member extending within the tank, said tubular member being provided with an inlet opening adjacent the bottom of the tank and an outlet adjacent the top of the tank, a baffle plate in the tank between the inlet of the tank and the inlet of said tubular member, a closure for the inlet end of the tubular member, a float within the tank, a connection between the float and the closure whereby said closure will be normally held open by the float and automatically closed by the float when the liquid reaches a predetermined height in the tank, and a guide for said connection, said guide being supported by the tubular member.

In testimony whereof I have signed my name to this specification, in the presence of two subscribing witnesses, on this 23rd day of April A. D. 1907.

ALLEN A. BOWSER.

Witnesses:
S. B. BECHTEL,
J. W. RUNYAN.